United States Patent [19]

Brown

[11] Patent Number: 4,544,054
[45] Date of Patent: Oct. 1, 1985

[54] MOUNTING SHAFT AND ADAPTOR FOR VISCOUS COUPLING

[75] Inventor: Richard J. Brown, Marshall, Mich.

[73] Assignee: Eaton Corporation, Cleveland, Ohio

[21] Appl. No.: 663,814

[22] Filed: Oct. 22, 1984

Related U.S. Application Data

[63] Continuation of Ser. No. 356,079, Mar. 10, 1982, abandoned.

[51] Int. Cl.[4] .......................... F16D 35/00; F16D 1/02
[52] U.S. Cl. .................................. 192/58 B; 403/362; 411/393
[58] Field of Search .............. 192/58 B; 403/362, 361, 403/374; 411/394; 29/526.8 R

[56] References Cited

U.S. PATENT DOCUMENTS

| | | | |
|---|---|---|---|
| 1,972,741 | 9/1934 | Kohl | 192/58 B |
| 2,092,985 | 9/1937 | Okner et al. | 403/362 X |
| 2,541,831 | 2/1951 | Prince | 192/58 B X |
| 3,174,600 | 3/1965 | Oldberg | 192/58 B |
| 3,197,894 | 8/1965 | Ratkowski | 411/393 |
| 3,227,254 | 1/1966 | Sutaruk | 188/290 X |
| 3,262,527 | 7/1966 | Allahen, Jr. | 192/58 B |
| 3,323,623 | 6/1967 | Roper | 192/58 B |
| 3,329,246 | 7/1967 | Kaplan | 192/58 B |
| 3,661,237 | 5/1972 | Thompson | 192/58 B |
| 3,856,122 | 12/1974 | Leichliter | 192/58 B |
| 3,885,765 | 5/1975 | Richards | 403/362 |
| 4,013,154 | 3/1977 | Brown | 192/58 B |
| 4,064,980 | 12/1977 | Tinholt | 192/58 B |
| 4,073,370 | 2/1978 | Tinholt | 192/58 B |
| 4,190,139 | 2/1980 | Tinholt et al. | 192/58 B |
| 4,228,880 | 10/1980 | Gee | 192/58 B |
| 4,320,723 | 3/1982 | Wendling et al. | 192/58 B X |

FOREIGN PATENT DOCUMENTS 0143908 12/1935 Austria ................................. 403/362

Primary Examiner—Rodney H. Bonck
Assistant Examiner—David D. House
Attorney, Agent, or Firm—C. H. Grace; L. J. Kasper

[57] ABSTRACT

A fluid coupling (11) is attached to a pulley (25) attached to an input shaft (35) and a hub (33) having a cylindrical opening. The coupling has an output member (11) and an input member rotatably disposed within a viscous fluid chamber to transmit torque from the input member to the output member in response to relative rotation therebetween. The input member includes a shaft (17) having a boss (47) adjacent the rear surface of the output member. The boss defines a cylindrical extension (49) located within the hub opening. A locking "V" groove (51) is located within the hub opening on the extension. Threaded openings (57) are radially disposed within the hub and have center lines offset with respect to the center line of the "V" groove when the components are assembled. A set screw (59) in each opening has a frusto-conical surface (61) engaged with an angled surface (63) of the "V" groove to draw the coupling and input shafts together. Radial surfaces (55 and 45) perpendicular to the axis A—A of rotation are located on the boss and hub and aid alignment of and securement of the two members. The boss also includes a pilot opening (53) engaged with the input shaft to aid alignment.

10 Claims, 4 Drawing Figures

MOUNTING SHAFT AND ADAPTOR FOR VISCOUS COUPLING

CROSS-REFERENCE TO RELATED APPLICATION

This application is a continuation of U.S. application Ser. No. 356,079, filed Mar. 10, 1982, now abandoned.

BACKGROUND OF THE DISCLOSURE

The invention relates to torque transmitting fluid couplings, and more particularly, to the mounting of such fluid couplings.

Conventionally, fluid couplings include an output coupling member defining a fluid chamber, an input coupling member rotatably disposed within the fluid chamber and a quantity of viscous fluid contained in the fluid chamber such that rotation of the input coupling member transmits torque to the output coupling member by means of viscous shear. The input coupling member is typically mounted on an input shaft, with the opposite end of the input shaft attached to some type of input drive member such as a flange associated with the engine water pump, or a pulley driven by the engine crankshaft through one or more V-belts (U.S. Pat. Nos. 3,661,237 and 3,899,059).

It has been common practice in the art to provide ample axial separation between the pulley and the fluid coupling to facilitate access to the bolts and nuts used to attach the input shaft flange to the pulley. However, as the trend toward compact and subcompact automobiles has developed, it has become necessary to reduce the size of many of the engine accessory components, and especially their axial dimensions. This has also been true in the case of fluid couplings used in automotive applications as the drive for the vehicle radiator cooling fan.

The attempts at shortening the axial length of the entire water pump-pulley-fluid coupling assembly have included the arrangement illustrated in U.S. Pat. Nos. 4,073,370 and 3,263,783. These assemblies use an externally-threaded hub and an internally-threaded, enlarged portion on the input shaft. It is, however, undesirable to require matching threads on a coupling and the device to which the coupling is attached in instances where the two components are manufactured by unrelated companies or at separate locations.

SUMMARY OF THE INVENTION

Accordingly, it is an object of the invention to provide a fluid coupling and assembly arrangement therefore of the type having a substantially reduced axial length.

It is also an object to provide such a fluid coupling and assembly arrangement which requires minimal matching of the assembled parts.

The above and other objects of the invention are accomplished by the provision of a fluid coupling adapted to be mounted in a cylindrical opening of a hub assembly. The fuid coupling comprises a first rotatable member defining a fluid chamber and a second rotatable member disposed within the fluid chamber. The fluid chamber includes a volume of fluid for transmitting torque from one of the first and second members to the other of the members in response to relative rotation therebetween. The second member includes a shaft and a cylindrical boss portion adapted to be located within the cylindrical opening. The boss portion defines a generally annular groove that is locatable within the opening. A plurality of threaded openings are circumferentially located in the hub assembly to receive set screws that are configured to contact the groove and retain the boss in tight engagement with the hub.

In accordance with another aspect of the invention, the boss portion may include a cylindrical opening that may be inserted over a cylindrical member of the hub assembly in a known manner to align the boss and hub assembly and, accordingly, the coupling with the driving shaft.

Another aspect of the invention is the provision of radial surfaces on the boss and hub assembly which are perpendicular to the axis of rotation of the input shaft and are used to align the coupling with the axis of the input shaft.

DESCRIPTION OF THE PREFERRED EMBODIMENT

Figure 1:
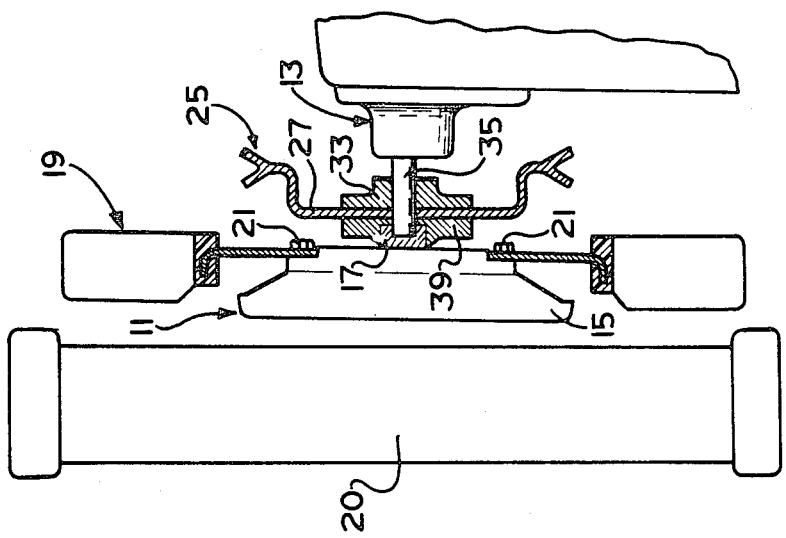
FIG. 1 is a semi-schematic view of the fluid coupling and assembly arrangement of the present invention.

Referring now to the drawings, FIG. 1 illustrates a fluid coupling device, generally designated 11, and an assembly arrangement by which the fluid coupling 11 may be mounted on a water pump, generally designated 13.

The fluid coupling 11 includes an output coupling member 15, which is driven in a known manner by an input coupling member secured to a coupling or input shaft 17. The fluid coupling 11 is shown herein as a drive for an automotive engine accessory, and specifically, as a drive for a vehicle radiator cooling fan. Such couplings are well known as indicated by U.S. Pat. No. 3,227,254, incorporated herein by reference. The fan 19 is typically bolted to the output coupling member 15 with a plurality of bolts 21 and is used to draw air through radiator 20. It will be understood, however, that the use of the present invention is not limited to any particular fluid coupling configuration or application.

The output coupling member 15 is mounted for rotation relative to input shaft 17 by means of a suitable bearing 23. Thus, the output coupling member 15 turns freely relative to the input coupling member and input shaft 17.

Disposed about the water pump 13 is a pulley member 25 which is driven by the engine crankshaft through a V-belt. The pulley 25 includes an annular portion 27 of reduced diameter which is attached by a plurality of bolts 29 (FIG. 2) to a flange portion 31 of a hub 33 which is rotatably disposed about a stub shaft 35 protruding from the water pump 13.

The hub 33 is preferably press fit on shaft 35 and includes a radially extending surface 37 which is perpendicular to axis A—A of shaft 35. An adaptor 39 includes a center hole 41 for concentric piloting to shaft 35 and a cylindrical opening 42 concentric with hole 41. Bolts 29 project through adaptor 39 and annular portion 27 into flange 31 to retain pulley 25. The adaptor has parallel radial surfaces 43 and 45. Surface 43 engages portion 27 and, together with hole 41, maintains surface 45 perpendicular to axis A—A. An assembled adaptor 39 rotates in a one-to-one relationship with shaft 35.

Input shaft 17 includes an enlarged boss portion 47 having a cylindrical extension portion 49 which includes a locking "V" groove 51. Cylindrical portion 49 is loosely received within opening 42. Radially aligned with cylindrical portion 49 is a cylindrical pilot opening 53 for aiding in the centering of shaft 17 relative to shaft 35 on axis A—A. Boss portion 47 further includes a radially extending surface contact 55 perpendicular to the axis of opening 53. In assembly, surface 55 contacts surface 45 of adaptor 39 to further aid in the alignment of shaft 17 with shaft 35 on axis A—A.

Figure 3:
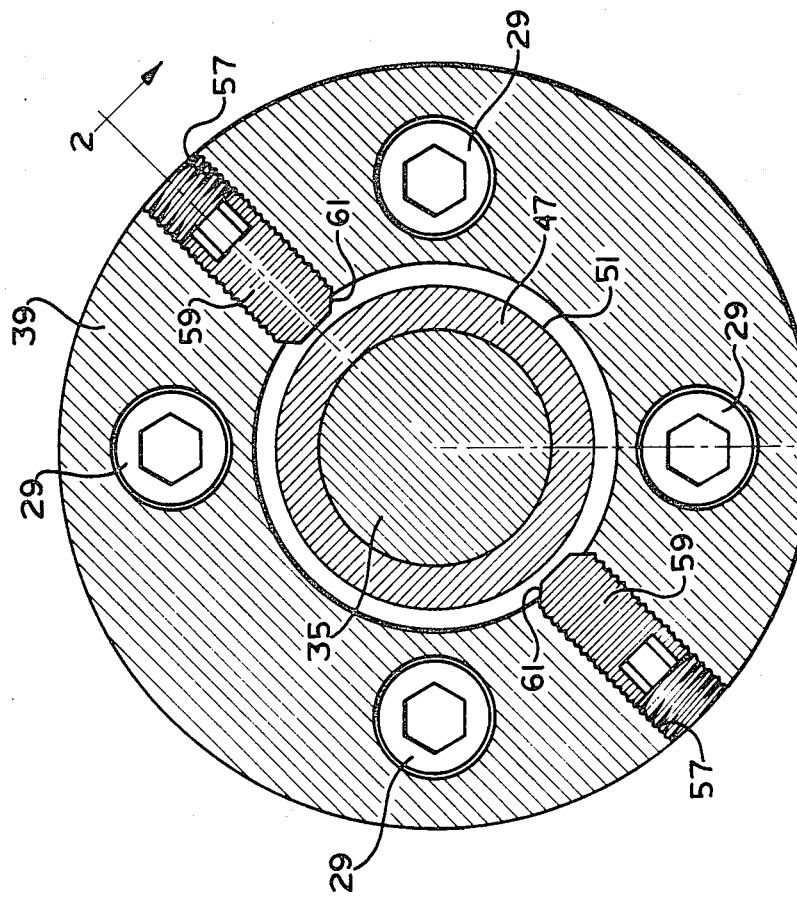
FIG. 3 is a transverse cross section taken on line 3—3 of FIG. 2.
Figure 4:
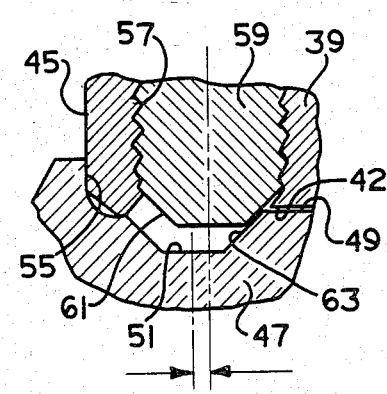
FIG. 4 is an enlarged view of the area in circle 4 of FIG. 2.
Figure 2:
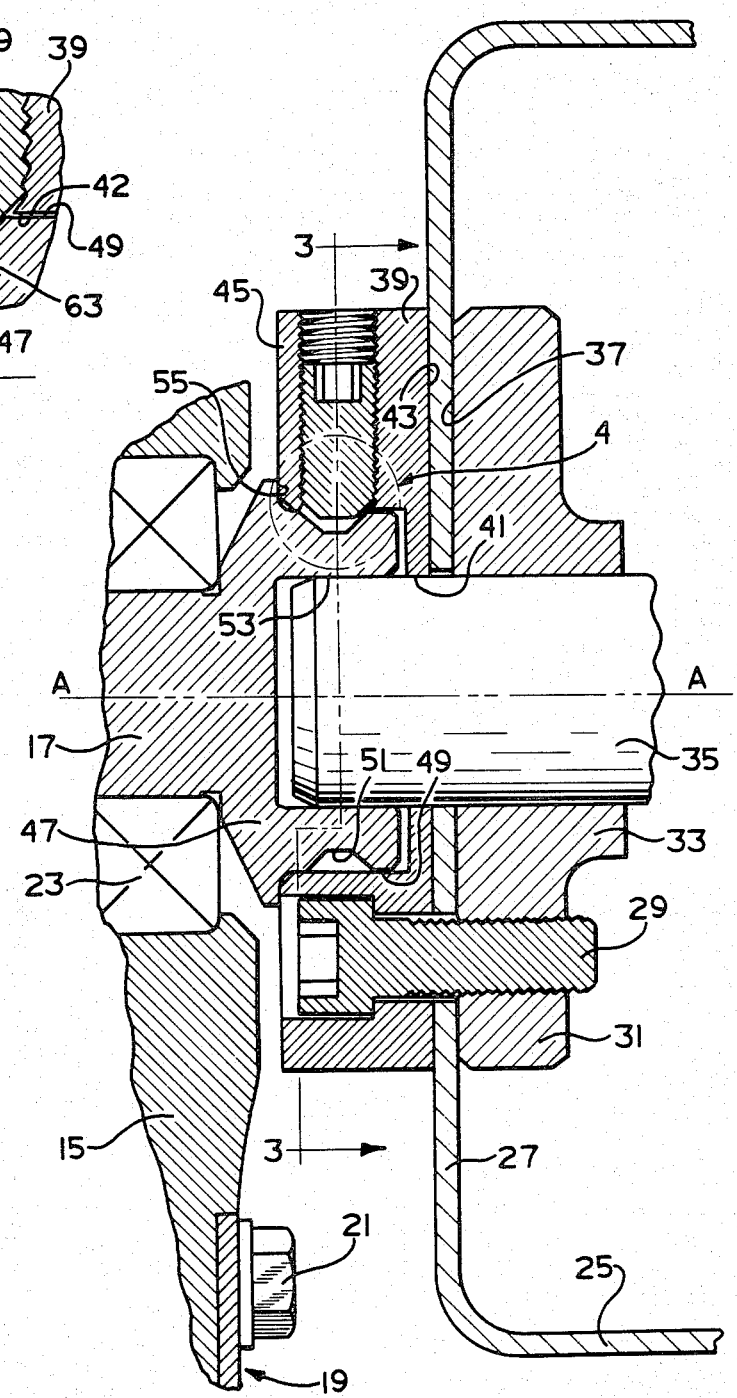
FIG. 2 is an enlarged sectional view of a portion of FIG. 1.

Referring to FIGS. 2-4, adaptor 39 further includes radially extending threaded openings 57 which are generally aligned with "V" groove 51 when boss portion 47 is located within adaptor 39. A set screw 59 is threaded within each opening 57 and includes a frusto-conical surface 61 for mating engagement with the angled surface 63 of the "V" groove. As best seen in FIG. 4, the center line of the locking "V" groove 51 is positioned off-center with respect to the center line of set screw openings 57 when the surfaces 55 and 45 are in contact. Tightening of set screws 59 against the off-set "V" groove causes a wedging action that forces the shaft 17 toward shaft 35. This forcing action moves the surfaces 55 of boss portion 47 into contact with surface 45 of adaptor 39. During movement of shaft 17 toward shaft 35, shaft 35 is free to slide within pilot opening 53 of boss portion 47.

It is contemplated that shaft 35 may be triangular, square, hexagonal, or the like and opening 53 configured for mating engagement. A similar modification is also contemplated for opening 42 and portion 49. It is further possible to shape both sets of these mating surfaces as frusto cones or the like. The important thing is to ensure the appropriate matching of the surfaces with axis A—A to assure the coaxial rotation of coupling and input shafts 17 and 35.

What is claimed is:

1. An assembly for mounting an input shaft coaxially with a fluid coupling having a first rotatable member defining a fluid chamber, a second rotatable member disposed within said fluid chamber, said fluid chamber including a volume of fluid for transmitting torque from one of said first and second members to the other of said first and second members in response to relative rotation therebetween and said second rotatable member including a coupling shaft, said assembly comprising:
   (a) a boss portion on said coupling shaft having an annular, hollow extension defined by lines surrounding the axis of said coupling shaft, said hollow extension receiving and piloting a forward end portion of said input shaft;
   (b) a contact surface on said extension;
   (c) a surface on said boss portion extending radially relative to said coupling shaft axis;
   (d) an adaptor secured to said input shaft for one-to-one rotation and having an opening configured to receive said extension of said boss portion, said opening being defined by lines surrounding the axis of said input shaft, whereby the assembly of said coupling shaft and said input shaft is substantially foreshortened;
   (e) a surface on said adaptor extending radially relative to said input shaft and configured for mating engagement with said radially extending surface on said boss portion; and
   (f) means engageable with said adaptor to contact said contact surface on said extension and force said extension into said adaptor opening and said radially extending surfaces into engagement.

2. An assembly according to claim 1 wherein:
   (a) said extension is cylindrical and coaxial with the axis of said coupling shaft; and
   (b) said opening in said adaptor is cylindrical and coaxial with said axis of said input shaft.

3. An assembly according to claim 2 wherein:
   (a) said contact surface is defined by an angled surface on a "V" groove located on said extension; and
   (b) said means to contact said contact surface include
      (1) a threaded opening within said adaptor extending radially relative to said input shaft axis, said center line of said threaded opening being off-set from the center line of said "V" groove when said radially extending surfaces on said boss portion and said adaptor are engaged; and
      (2) a member in threaded engagement with said threaded opening and including a frustoconical surface adapted to be engaged with said angled surface of said "V" groove.

4. An assembly according to claim 3 wherein:
   (a) said radially extending surface on said boss portion is perpendicular to said coupling shaft axis; and
   (b) said radially extending surface on said adaptor is perpendicular to said input shaft axis.

5. An assembly according to claim 4 wherein said adaptor includes a pilot opening for sliding engagement with said input shaft to maintain said radially extending surface of said adaptor perpendicular to said axis of said input shaft.

6. An assembly according to claim 1, 2, 3, 4, or 5 wherein: said boss portion further includes an opening defined by lines surrounding the axis of said coupling shaft and radially inwardly from the surface of said extension, said opening being configured to receive said input shaft to axially align said input shaft and said coupling shaft.

7. An assembly according to claim 3 wherein said means to contact said contact surface includes a plurality of said threaded openings and threaded members circumferentially arrayed around said input shaft axis.

8. An assembly according to claim 2, 3, or 4 wherein said adaptor is secured to said input shaft by a plurality of threaded members.

9. An assembly according to claim 1 wherein:
   (a) said contact surface is a surface at an acute angle relative to said axis; and
   (b) said means to contact said contact surface is a member having a surface engageable with said contact surface.

10. An assembly according to claim 1 wherein:
   (a) said radially extending surface on said boss portion is perpendicular to said coupling shaft axis; and
   (b) said radially extending surface on said adaptor is perpendicular to said input shaft axis.

* * * * *